United States Patent
Heiss

(10) Patent No.: US 12,480,945 B2
(45) Date of Patent: Nov. 25, 2025

(54) SYSTEMS AND METHODS FOR UTILIZING COMBINED MAGNETIC NANOPARTICLES AND NANOBODIES

(71) Applicant: Jaime Heiss, Menlo Park, CA (US)

(72) Inventor: Jaime Heiss, Menlo Park, CA (US)

(*) Notice: Subject to any disclaimer, the term of this patent is extended or adjusted under 35 U.S.C. 154(b) by 627 days.

(21) Appl. No.: 18/074,305

(22) Filed: Dec. 2, 2022

(65) Prior Publication Data

US 2023/0176043 A1 Jun. 8, 2023

Related U.S. Application Data

(60) Provisional application No. 63/285,492, filed on Dec. 3, 2021.

(51) Int. Cl.
*G01N 33/543* (2006.01)

(52) U.S. Cl.
CPC ... *G01N 33/54333* (2013.01); *G01N 2446/20* (2013.01)

(58) Field of Classification Search
None
See application file for complete search history.

(56) References Cited

U.S. PATENT DOCUMENTS

| | | | |
|---|---|---|---|
| 2021/0137407 A1 | 5/2021 | Vogel | |
| 2022/0163607 A1 | 5/2022 | Vogel | |

FOREIGN PATENT DOCUMENTS

| | | | |
|---|---|---|---|
| DE | 102010011936 B4 | 9/2015 | |
| WO | WO-2019100080 A1 * | 5/2019 | ........... C12Q 1/6811 |

OTHER PUBLICATIONS

Hughes et al., Selective activation of mechanosensitive ion channels using magnetic particles, J. R. Soc. Interface., 5(25), (2008), p. 855-63 (Year: 2008).*
Del Sol-Fernández et al., Magnetogenetics: remote activation of cellular functions triggered by magnetic switches, Nanoscale, 14, (2022), p. 2091-2118. (Year: 2022).*
Nikitin, Petr I. et al. "New type of biosensor based on magnetic nanoparticle detection" Journal of Magnetism and Magnetic Materials 311 (2007): 445-449.
Orlov, Alexey V. et al. "Multiplex Biosensing Based on Highly Sensitive Magnetic Nanolabel Quantification: Rapid Detection of Botulinum Neurotoxins A, B, and E in Liquids" Analytical Chemistry 88 (2016): 10419-10426.
Dieckhoff, Jan et al. "Fluxgate based detection of magnetic nanoparticle dynamics in a rotating magnetic field" Applied Physical Letters 99 (2011): 112501.

(Continued)

*Primary Examiner* — Ellen J Marcsisin
(74) *Attorney, Agent, or Firm* — Pillsbury Winthrop Shaw Pittman LLP

(57) ABSTRACT

Disclosed are systems, methods, and computer software for determining a conformational change in a structure of a protein. One method includes delivering a magnetic nanoparticle-nanobody (MNP-NB) complex to a sample containing a protein, where the MNP-NB complex will bind to the protein in the sample. An external magnetic field is applied to the sample with a magnetic field generation system. Signals are detected from the MNP-NB complex that reflect a response to the external magnetic field and a conformational change in a structure of the protein in the sample is determined from the signals.

16 Claims, 9 Drawing Sheets

(56) References Cited

OTHER PUBLICATIONS

Zhong, Jing et al. "Toward Rapid and Sensitive Detection of SARS-CoV-2 with Functinoalized Magnetic Nanoparticles" ACS Sensors 6 (2021): 976-984.

Heim, Erik et al. "Binding assays with streptavidin-functionalized superparamagnetic nanoparticles and biotinylated analytes using fluxgate magnetorelaxometry" Journal of Magnetism and Magnetic Materials 321 (2009): 1628-1631.

Hong, Chin-Yih et al. "Magnetic susceptibility reduction method for magnetically labeled immunoassay" Applied Physical Letters 88 (2006): 212512.

Krause, Hans-Joachim et al. "Magnetic particle detection by frequency mixing for immunoassay applications" Journal of Magnetism and Magnetic Materials 311 (2007): 436-444.

Orellana, Laura "Large-Scale Conformational Changes and Protein Function: Breaking the in silico Barrier" Frontiers in Molecular Biosciences 6 (2019): 1-18.

Orlov, Alexey et al. "Magnetic Immunoassay for Detection of Staphylococcal Toxins in Complex Media" Analytical Chemistry 85 (2013): 1154-1163.

Pietschmann, Jan et al. "Brief Communication: Magnetic Immuno-Detection of SARS-CoV-2 specific" bioRxiv (2020) https://doi.org/10.1101/2020.06.02.131102.

Vogel, Patrick et al. "Critical Offset Magnetic PArticle SpectroScopy for rapid and highly sensitive medical point-of-care diagnostics" Nature Communications 13:7230 (2022) 1-9.

Wu, Kai et al. "One-Step, Wash-free, Nanoparticle Clustering-Based Magnetic Particle Spectroscopy Bioassay Method for Detection of SARS-CoV-2 Spike and Nucleocaspid Proteins in the Liquid Phase" Applied Materials and Interfaces 13 (2021) 44136-44146.

Wu, Kai et al. "Magnetic Particle Spectroscopy for Detection of Influenza A Virus Subtype H1N1" Applied Materials and Interfaces 12 (2020) 13686-13697.

Wu, Kai et al. "Magnetic Nanoparticle Relaxation Dynamics-Based Magnetic Particle Spectroscopy for Rapid and Wash-Free Molecular Sensing" Applied Materials and Interfaces XX (2019) A-H.

Wu, Kai et al. "Magnetic Particle Spectroscopy: A Short Review of Applications" ASC Appl. Nano Mater. 3 (2020) 4972-4989.

Wu, Kai et al. "A Portable Magnetic Particle Spectrometer for Future Rapid and Wash-Free Bioassays" ACS Appl. Mater. Interfaces 13(7) (2021) 7966-7976.

Zhang, Xiaojuan et al. "Molecular Sensing with Magnetic Nanoparticles Using Magnetic Spectroscopy of Nanoparticle Brownian Motion" Biosens Bioelectron 50 (2013) 1-15.

Zhong, Jing et al. "Magnetic nanoparticle-based biomolecule imaging with a scanning magnetic particle spectrometer" Nanotechnology 31 (2020) 225101 (9pp).

Zhong, Jing et al. "Dependence of biomolecule detection on magnetic nanoparticle concentration" Journal of Magnetism and Magnetic Materials 517 (2021) 167408.

* cited by examiner

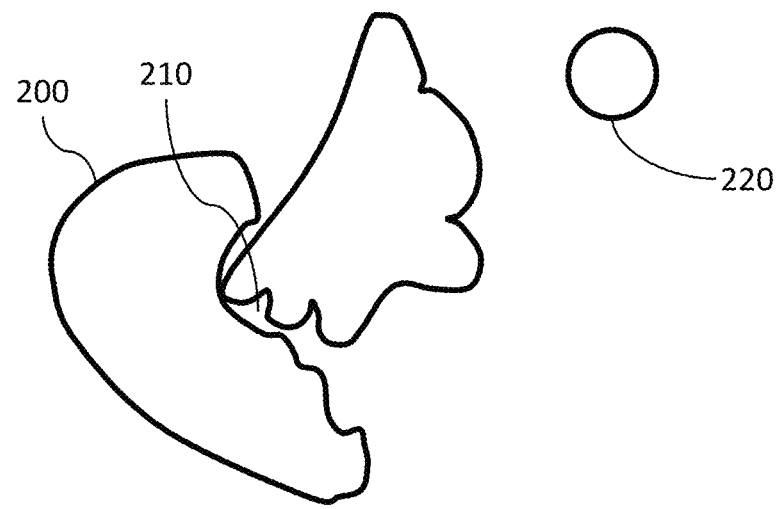
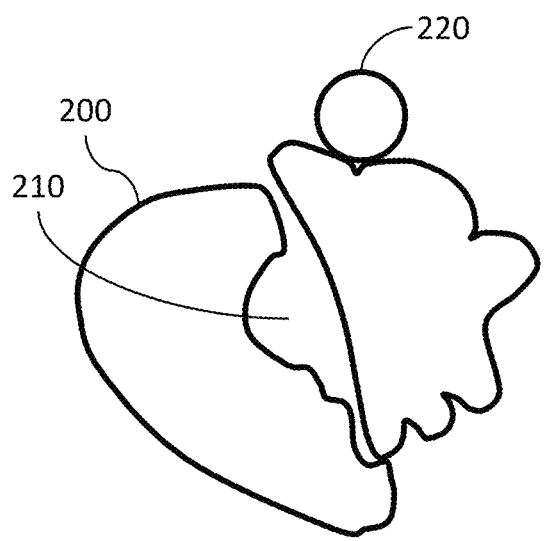
FIG. 2

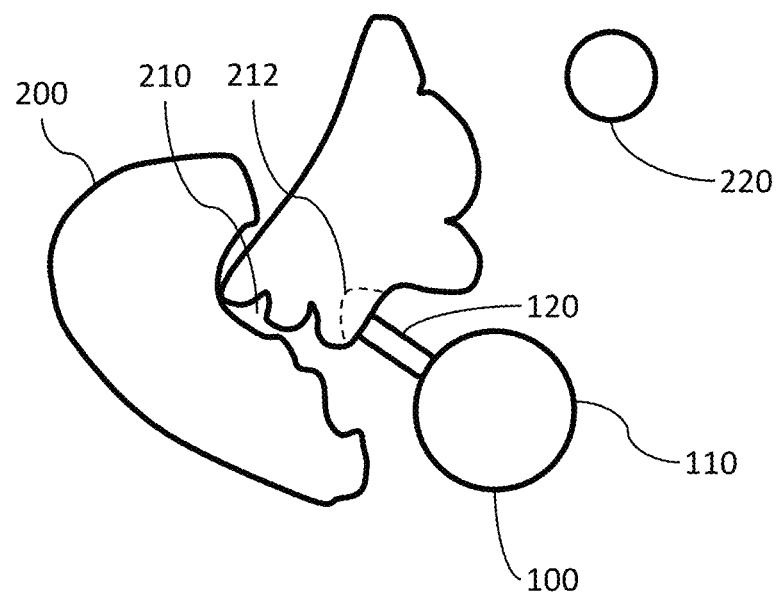
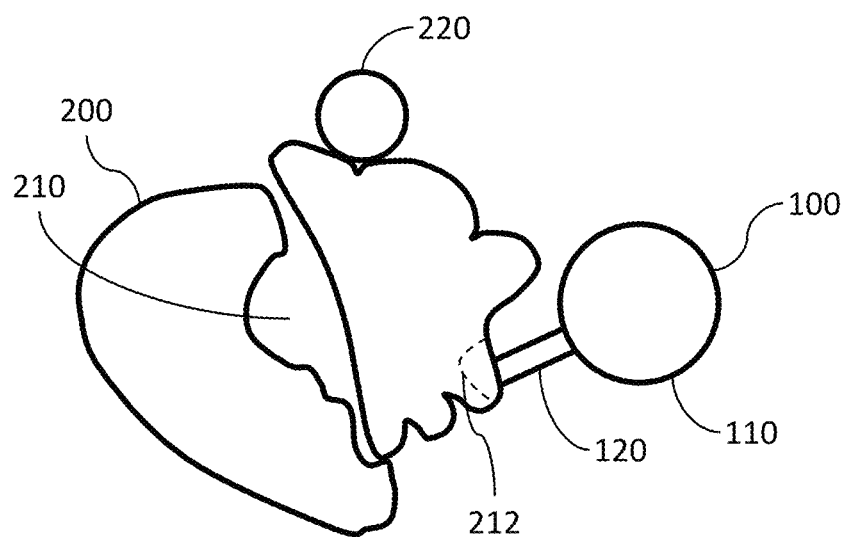
FIG. 3

(510) Delivering a Magnetic Nanoparticle-Nanobody (MNP-NB) complex to a sample containing a protein, wherein the MNP-NB complex will bind to the protein in the sample (520) Applying an external magnetic field with a magnetic field generation system to the sample (530) Detecting signals from the MNP-NB complex that reflect a response to the external magnetic field (540) Determining, from the signals, a conformational change in a structure of the protein in the sample

FIG. 5

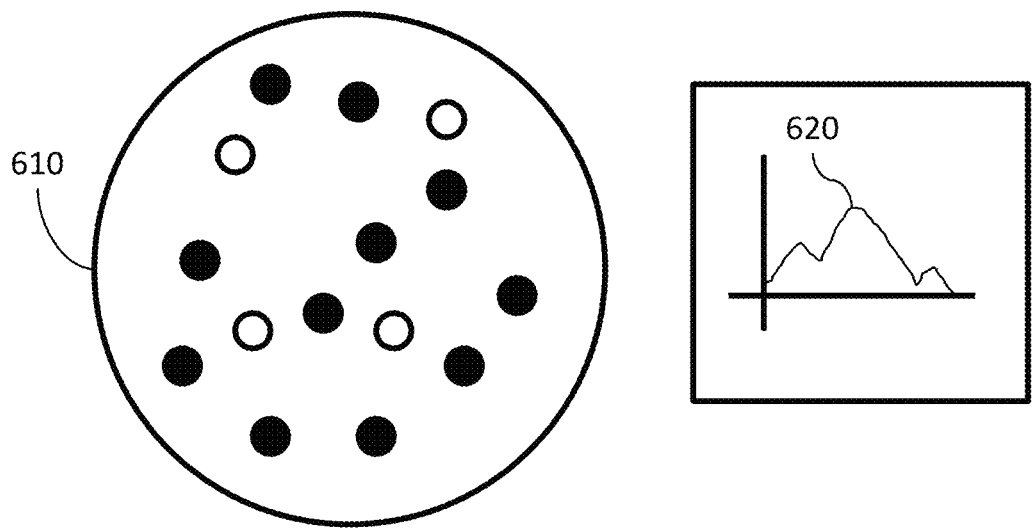
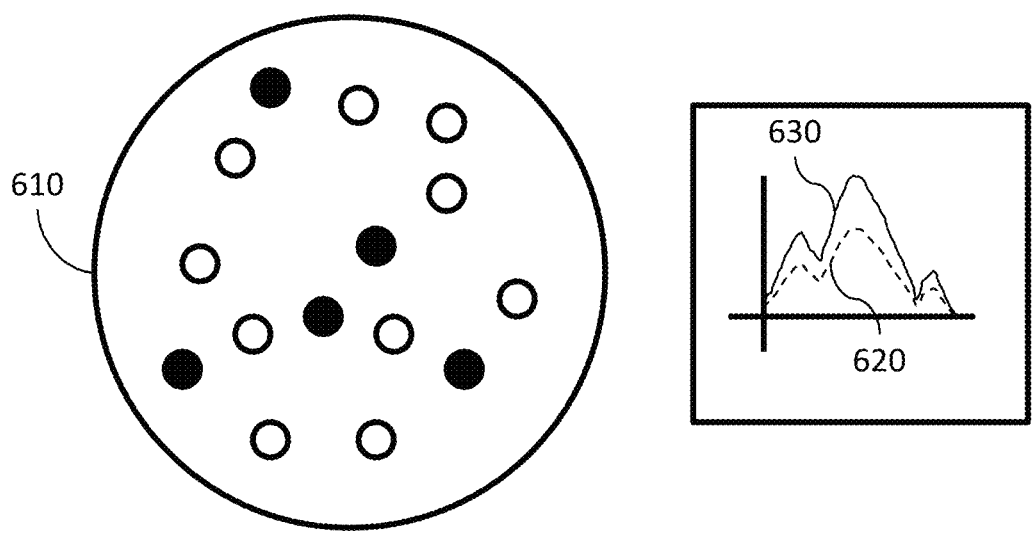
FIG. 6

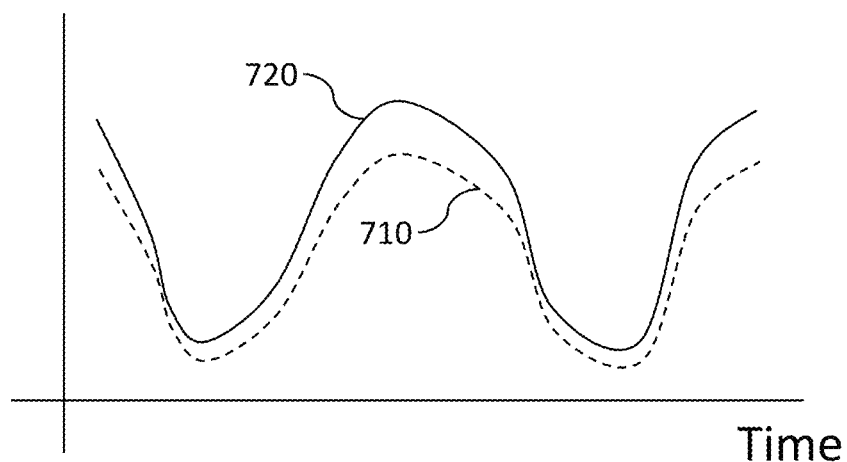
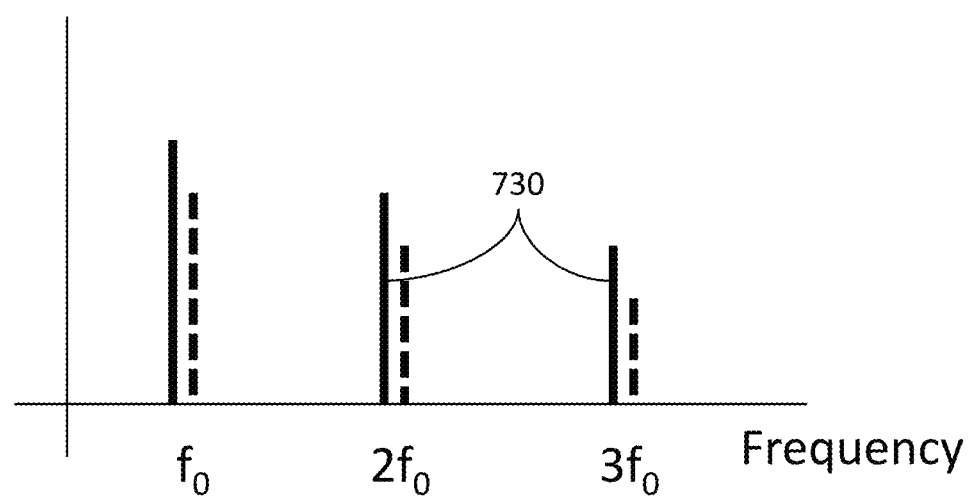
FIG. 7

SYSTEMS AND METHODS FOR UTILIZING COMBINED MAGNETIC NANOPARTICLES AND NANOBODIES

RELATED APPLICATION(S)

This application claims priority to and the benefit of U.S. Provisional Application No. 63/285,492, filed Dec. 3, 2021, titled "Functional Protein Detection," which is hereby incorporated by reference.

DESCRIPTION OF THE RELATED ART

Magnetic nanoparticles are small particles that respond to magnetic fields. Some magnetic nanoparticles can include coatings to aid in attaching them to antibodies, which in turn can be attached to biological elements. The attached magnetic nanoparticles can then be detected utilizing varying magnetic fields in order to determine or infer biological conditions or activity.

SUMMARY

Disclosed are systems, methods, and computer software for determining a conformational change in a structure of a protein. In one aspect, a method includes delivering a magnetic nanoparticle-nanobody (MNP-NB) complex to a sample containing a protein, where the MNP-NB complex will bind to the protein in the sample. An external magnetic field is applied to the sample with a magnetic field generation system. Signals are detected from the MNP-NB complex that reflect a response to the external magnetic field and a conformational change in a structure of the protein in the sample is determined from the signals.

In some variations, the conformational change can be an opening or closing of a channel in the protein. The channel can be a part of a membrane receptor, in a membrane of a cell, or part of a membrane protein that regulates cell physiology.

In other variations, the MNP-NB complex can include an MNP with a diameter of 5-50 nm and an NB with a diameter of 1-5 nm. The MNP-NB complex can include an avidin coating on the MNP and the NB conjugated with biotin.

In yet other variations, the determining of the conformational change utilizes magnetic particle spectroscopy. Frequency harmonics of the signal can be determined where the conformational change can be determined based at least on the frequency harmonics.

In some variations, the conformational change can be determined utilizing AC susceptibility measurements. The magnetic field generation system can be configured for AC susceptibility measurement and can include being configured to measure a detector response based on the signals and determine a magnetic susceptibility, where the conformational change is determined based at least on the magnetic susceptibility. The determining of the conformational change can also utilize both magnetic particle spectroscopy and AC susceptibility measurements.

In other variations, ligands can be introduced to the sample, the ligands causing the conformational change in the structure of the protein by binding to the protein. Also, the conformational change can be determined based on the signals and a baseline signal obtained from the sample prior to introduction of the ligands.

In yet other variations, an amount of MNP-NB complexes can be delivered over time to the sample, where at least a portion of the MNP-NB complexes become unbound or leave the sample over time. Signals can be detected over time from the MNP-NB complexes currently bound in the sample. Conformational changes of proteins in the sample can be determined over time.

In some variations, various methods can include determining an effectiveness, presence and/or amount of a drug in a subject based on the signal. A presence and/or amount of multiple types of proteins can be determined based on the signal.

In other variations, human brain activity of a subject can be measured based at least on the signal. A machine instruction can be generated that, when executed by a machine, causes the machine to perform an operation.

In yet other variations, human brain activity of a subject can be measured based at least on the signal. The human brain activity can be mapped to a thought as indicated by the subject. Subsequent thoughts can be determined based on subsequent signals and the mapping.

In an interrelated aspect, a method can include delivering a Magnetic NanoParticle-NanoBody (MNP-NB) complex to a sample containing a protein, where the MNP-NB complex will bind to the protein in the sample. An external magnetic field with a magnetic field generation system is applied to the sample. Signals are detected from the MNP-NB complex that reflect a response to the external magnetic field. An environmental change around the protein in the sample is determined from the signals.

In some variations, the environmental change can be a change in an electrical background surrounding the protein or a change of a pH surrounding the protein.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 2 is a simplified representation of a protein undergoing a conformational change in accordance with certain aspects of the present disclosure, FIG. 3 illustrates the simplified protein representations of FIG. 2 with an MNP-NB complex bound to the protein, in accordance with certain aspects of the present disclosure, FIG. 5 is a process flow diagram illustrating an exemplary method of determining a conformational change in a protein, in accordance with certain aspects of the present disclosure, FIG. 6 is a diagram illustrating exemplary changes in signals from samples having different numbers of open and closed channels, in accordance with certain aspects of the present disclosure, FIG. 7 is a simplified diagram illustrating plots of exemplary magnetic particle spectroscopy measurements, in accordance with certain aspects of the present disclosure.

DETAILED DESCRIPTION

The systems, methods, and computer software described herein can be utilized to monitor magnetic nanoparticles (MNPs) for a variety of applications, for example, determining conformational changes in proteins and determining in vitro or in vivo environmental changes that may be indicative of certain physiological conditions, etc.

The detection and imaging of MNPs can allow 2D and 3D imaging and can provide information about the extent and nature of what the MNPs are attached to. MNPs can be utilized for a number of biomedical applications, including magnetic hyperthermia, enhancing magnetic resonance imaging (MRI), supplementing tissue engineering efforts, and improving the delivery of drugs too difficult to reach microniches. These small particles (e.g., 2-100 nm in diameter) can be coupled with other particles, such as conjugated antibodies and, as described further below, nanobodies.

An antibody, also known as an immunoglobulin, is a large, Y-shaped protein used by the immune system to identify and neutralize foreign objects such as pathogenic bacteria and viruses. The antibody recognizes a unique molecule of the pathogen, called an antigen. Antigens are commonly proteins or polysaccharides. Polypeptides, lipids, nucleic acids, and many other materials can also function as antigens. Each tip of the "Y" of an antibody contains a paratope (analogous to a lock) that is specific for one particular epitope (analogous to a key) on an antigen, allowing these two structures to bind together with precision. An epitope is typically a protein segment that is five to eight amino acids long.

In numerous embodiments of the present disclosure, rather than binding MNPs to antibodies, they are combined with smaller nanobodies (NBs). Nanobodies can be, for example, target-binding fragments of an antibody. Unlike antibodies, which are relatively large molecules (150 kDa or 10 nm in length), nanobodies present a similar lock and key binding mechanism (paratope-epitope) but can have much smaller sizes (e.g., $1/10^{th}$ that of antibodies) and can also be easier to produce. In addition, due to their small size, they can reach and bind to almost any part of a protein with minimal interference.

Figure 1:
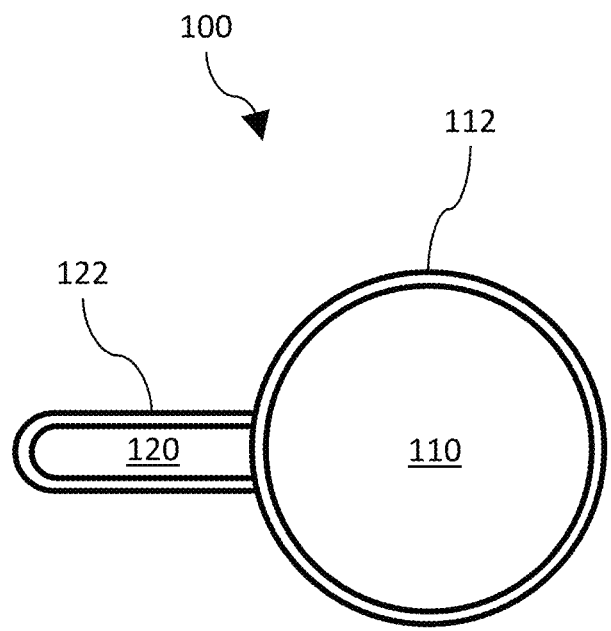
FIG. 1 is a simplified diagram illustrating an exemplary magnetic nanoparticle-nanobody complex (MNP-NB complex) in accordance with certain aspects of the present disclosure.

FIG. 1 is a simplified diagram illustrating an exemplary magnetic nanoparticle-nanobody complex (MNP-NB complex) in accordance with certain aspects of the present disclosure. As shown in FIG. 1, the MNP-NB complex 100 can include an MNP 110 and an NB 120, with MNP 110 functionalized by way of a coating 112 and NB 120 conjugated with a complementary binding molecule 122.

As described above, the nanobody 120 can be smaller than an antibody. For example, an antibody can be about 10 nm in length, whereas a nanobody can be approximately 4 nm in length, with a diameter of about 2.5 nm. As such, the nanobody can be configured to bind to a protein at a binding site where an antibody cannot reach (or is unlikely to). The present disclosure contemplates MNP-NB complexes utilizing nanobodies that are much smaller than antibodies and therefore cause less interference with the original physical properties of the bound molecule. Nanobodies can have, for example, lengths of 1.0 nm, 2.0 nm, 4.0 nm, or 1-10 nm. Nanobodies can have diameters of, for example, 1-5 nm, 2-3 nm, 2.5 nm, etc. Nanobodies can have molecular weights less than typical antibodies, for example approximately $1/20$, $1/10$, $1/5$, etc. (e.g., approximately 15 kDa for a nanobody instead of 150 kDa for an antibody).

In some embodiments, the MNP 110 can include iron-oxide, allowing it to respond to applied external magnetic fields. In other embodiments, MNP 110 can include magnetite ($Fe_3O_4$), an oxidized form of maghemite ($\gamma$-$Fe_2O_3$), combinations of both, or modifications of $Fe_2O_3$ (e.g., $BiFeO_3$). In some embodiments, MNP 110 can be a metallic-core nanoparticle (e.g., cobalt cores with a gold shell as well as gadolinium and manganese particles). The present disclosure contemplates the utilization of MNPs having diameters of, for example, 2 nm, 5 nm, 10 nm, 20 nm, 50 nm, 5-20 nm, 10-15 nm, etc.

As shown in FIG. 1, the MNP can include a coating 112 that facilitates binding to nanobody 120. MNPs can be linked to nanobodies, for example, by using a short linker or via direct interactions through different chemical reactions (thio-maleimide reaction, amine-carboxyl reaction) or bio-recognitions like avidin-biotin or polyethylene glycol (PEG)-carboxylic acid. Other functionalization elements that can be used are amines, toluene and other types of binding molecules like aptamers and even directly functionalized with nanobodies or antibodies as well as proteins that bind to other antibodies, like protein A. In addition, nanobody 120 can be conjugated with a complementary binding molecule 122 such as biotin in the case of avidin or streptavidin MNP functionalization, protein or an N-hydroxysuccinimide group in the case of PEG functionalized MNPs, etc. The nanobody and the MNP-NB complex can be further configured to bind to a specific epitope in a protein, for example, binding to the extracellular domain of a receptor, such as to a location on the protein undergoing a conformational change during opening and closing of the channel. In some embodiments, such configurations can be realized by engineering the paratope of the nanobody to match a sequence of amino acids present in the desired point of binding. One example of engineering a nanobody can include providing synthetic RNA to a ribosome to make a protein, including the short sequence that the desired nanobody will recognize. The short protein can then be injected into a host (e.g., a llama) and the host immune system will produce the nanobodies for that sequence. The nanobodies can then be harvested from blood samples and cloned.

FIG. 2 provides a simplified representation of a protein undergoing a conformational change in accordance with certain aspects of the present disclosure. In this example, the protein is changing from having a channel being closed (top) to being open (bottom), for example, due to a ligand attaching to the protein. Other conformational changes can include, for example, the relative positional changes between the light-chain domain and the catalytic domain on actin molecules during muscle contraction driven by the binding of nucleotides and actin. As used herein, the term "conformational change" should be broadly construed to refer to any change in physical structure. In addition, while the present disclosure discusses the binding of MNP-NB complexes to proteins, it is contemplated that the concepts discussed herein can be similarly applied through binding of such complexes to other materials such as glucose, sugars, etc.

As shown in FIG. 2, one example of a conformational change can thus be the opening or closing of a channel 210 in protein 200. A channel may be an ion channel such as sodium, calcium, potassium, chloride, etc., which can participate in neuronal communication, muscle contraction and other processes. Other channels are contemplated that do not involve charged particles, such as, glucose channels that allow glucose to enter a cell to provide energy. In some implementations, the channel may be part of a membrane receptor, or in the membrane of a cell. A channel can be, for example, part of a neurotransmitter receptor allocated in the cellular membrane of a postsynaptic neuron, part of a membrane protein expressed on a cultured cell on a petri dish, etc. In other implementations, the channel may be part of a membrane protein that regulates cell physiology, a ligand-gated channel, a voltage-gated channel, a temperature-gated channel, a metabotropic channel, etc. The example in FIG. 2 depicts a ligand-gated channel, with the top portion of FIG. 2 showing ligand 220 as not attached to the protein and the channel closed. The bottom portion of FIG. 2 shows the ligand attached to the protein, causing the conformational change of the channel opening.

FIG. 3 illustrates the simplified protein representations of FIG. 2 with an MNP-NB complex bound to the protein, in accordance with certain aspects of the present disclosure. Here, the MNP-NB complex 100 is shown bound to protein 200 via an NB 120 being attached to an epitope 212 of the protein. As shown in the top portion of FIG. 3, before activation by the ligand, the protein bound with the MNP-NB complex has a particular physical configuration that would result in a particular response to an applied magnetic field. For example, the protein and MNP-NB complex can have a particular mass, size, moment, etc., that can govern its oscillatory, translational and/or rotational responses to a magnetic field (for example, Neel and Brownian relaxation times).

The bottom portion of FIG. 3 then shows the protein and bound complex after activation by the ligand, which has induced a conformational change in the protein. Part of the protein has moved, opening the channel. The MNP-NB complex (which is attached to the moving part of the protein) has moved as well and therefore the protein and its bound complex as a whole now have a different configuration. This different configuration will have different magnetic characteristics, which can be detected and analyzed as described herein.

Thus, such MNP-NB complexes bound to proteins can allow a noninvasive method to wirelessly monitor protein function without the need to disturb and damage the surrounding environment of the proteins with wires, lenses or light beams. This can permit the safe study of human brain activity at the temporal and spatial resolution required to map the measured activity to actual thoughts, for prolonged periods of time. Moreover, various embodiments can provide the detailed information required to fully understand the underlying synaptic events of neuronal activation. Embodiments of the present disclosure can thus utilize the conformational change of proteins bound to MNP-NB complexes (e.g., when channels open and close) as the source of a change in magnetic characteristics, which can be detected as a wireless signal. Coupled with the specificity of channel type being open, information about brain activity (for example) can be obtained. Other embodiments can be utilized for a high-throughput drug screening system that can significantly reduce the time and cost of drug discovery processes, for example, by wirelessly monitoring opening and closing of channels expressed on a cell in presence of different concentrations of a ligand. Other in vitro and in vivo processes that involve conformational changes of proteins can be monitored like muscle contraction and opening of glucose channels.

When proteins undergo conformational changes, with MNP-NB complexes attached (as shown in FIG. 3), the magnetic characteristics of the protein with attached complex changes. These changes may be measured utilizing the systems and techniques described herein.

Figure 4A:
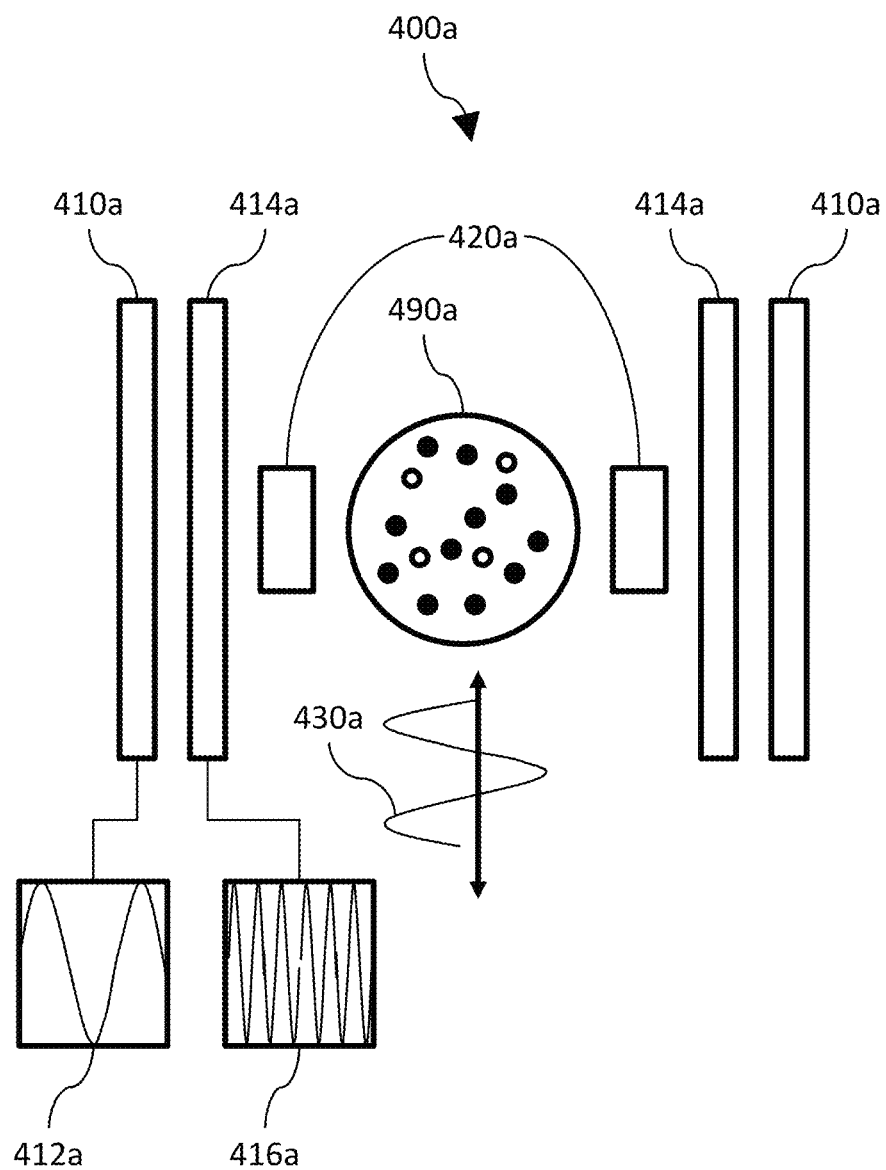
FIG. 4A is a diagram illustrating a simplified view of an exemplary magnetic field generation system suitable for magnetic particle spectroscopy, in accordance with certain aspects of the present disclosure.

FIG. 4A is a diagram illustrating a simplified view of an exemplary magnetic field generation system 400a suitable for magnetic particle spectroscopy, in accordance with certain aspects of the present disclosure. Magnetic field generation system 400a is depicted that includes outer coil 410a and inner coil 414a. Outer coil 410a and inner coil 414a are shown delivering external magnetic field 430a to sample 490a, for example, a collection of proteins with MNP-NB complexes bound to at least a portion of them. As used herein, the term "sample" means a region or volume that is being measured, which may be in vitro or in vivo. A sample can include a single protein or a collection of proteins.

In some embodiments, the protein and attached MNP-NB complex can be exposed to spatially and/or temporally varying external magnetic fields. The MNP can then respond to the variation and produce signals that can be detected and analyzed. The signals produced may be due to a Neel and Brownian relaxation of the protein and its attached MNP-NB complex in the external magnetic field. For temporally varying magnetic fields, the sample may be static, but the time variation (e.g., AC oscillation) can expose the MNP-NB complex to different amplitudes and directions of a magnetic field.

In FIG. 4A, one embodiment of magnetic field generation system 400a is depicted that includes outer coil 410a connected to a low-frequency power supply 412a, and an inner coil 414a connected to a high-frequency power supply 416b. Low-frequency power supply 412a can be configured to deliver current at 1-100 Hz, 10-75 Hz, 30-60 Hz, 50 Hz, etc. to generate external magnetic field 430a at a low frequency. High-frequency power supply 416a can be configured to deliver current at 0.1-1000 kHz, 1-50 kHz, 2-25 kHz, 3-20 kHz, 5 kHz, 10 kHz, etc. to generate external magnetic field 430a a high frequency. Detector 420a can be pickup coils or other types of magnetic field sensors that can detect and read out signals from sample 490a. The response at detector 420a can be digitized, amplified, filtered, etc. to provide data for analysis by any of the methods described herein.

Exemplary magnetic field generation system 400a for MPS is only one example of such a system that can deliver external magnetic fields to a sample. Another example of a type of magnetic field generation system is described below, and as such the present disclosure contemplates numerous configurations and variations of magnets and detectors.

Figure 4B:
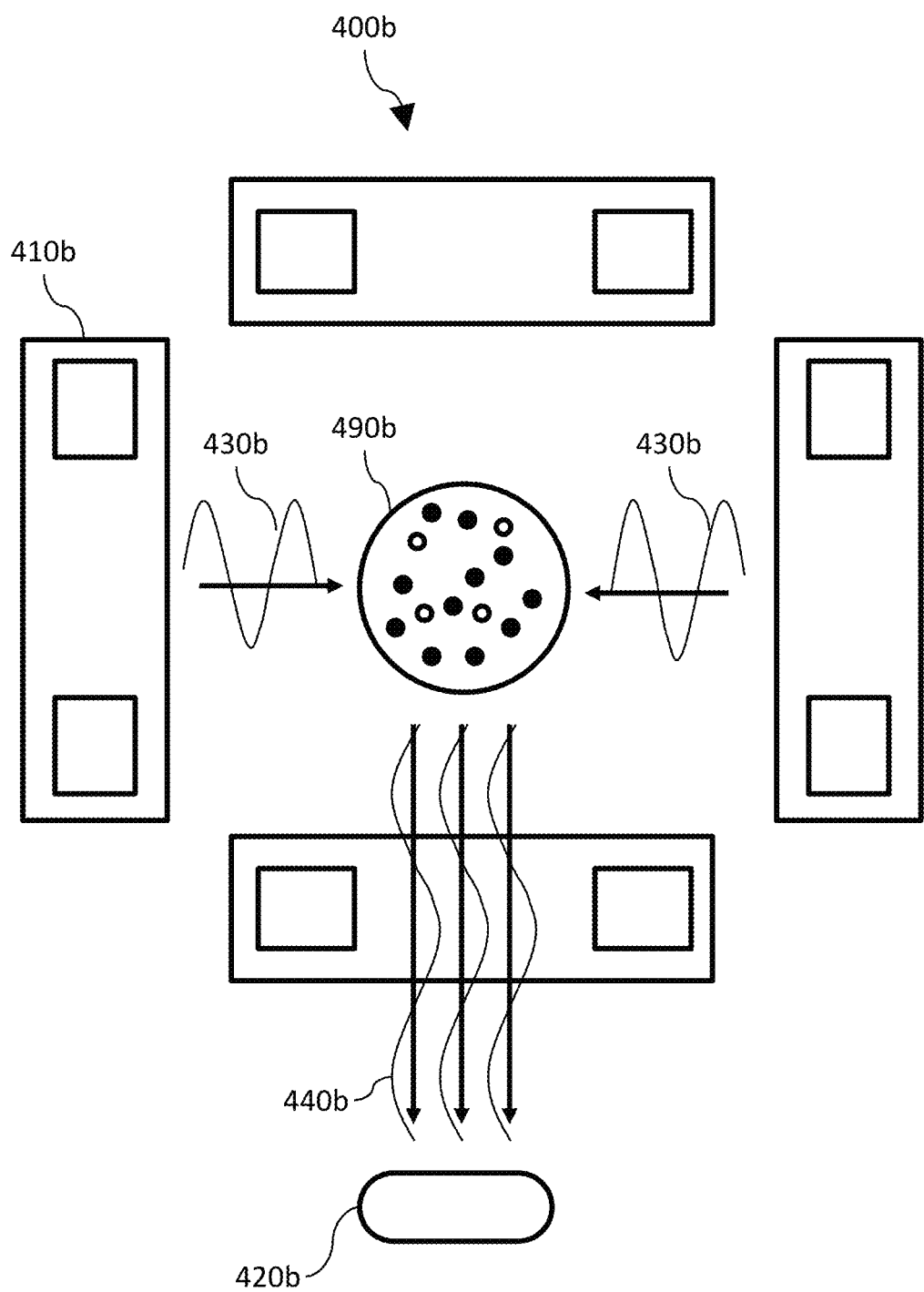
FIG. 4B is a diagram illustrating a simplified view of an exemplary magnetic field generation system suitable for AC susceptibility measurements, in accordance with certain aspects of the present disclosure.

FIG. 4B is a diagram illustrating a simplified view of an exemplary magnetic field generation system 400b suitable for AC susceptibility measurements, in accordance with certain aspects of the present disclosure. AC electromagnet 410b is shown delivering an external magnetic field 430b to a sample 490b. In FIG. 4B, one embodiment of a magnetic field generation system 400b is depicted that includes an AC electromagnet 410b and a detector 420b configured to detect the signals from the MNP-NB complex. The specific electromagnet shown represents a two-axis Helmholtz coil, though any other type of electromagnet capable of delivering varying magnetic fields at the sample can be utilized. In certain implementations, the external magnetic field 430b may be varied with time and signals 440b from the MNP-NB complex detected at the detector 420b. The magnetic field generation system can be configured to generate the external magnetic field with a frequency range of, for example, 0.5 Hz to 100 kHz. In some embodiments, the detector can include a magnetic pickup coil and bandpass filter. Accordingly, some methods can include filtering to a particular frequency band to reduce the amount of data to analyze, reduce the influence of noise, etc. In some embodiments, the detector can include a number of individual detectors, arranged geometrically to allow tomographic acquisition of the signals.

The above descriptions of exemplary MNP-NB complexes and exemplary magnetic field generation system can be utilized in processes for determining conformational changes in proteins. FIG. 5 is a process flow diagram illustrating an exemplary method of determining a conformational change in a protein, in accordance with certain aspects of the present disclosure. The process depicted in FIG. 5 can include, at 510, delivering an MNP-NB complex to a sample containing a protein, where the MNP-NB complex will bind to the protein in the sample. At 520, an external magnetic field can be applied to the sample with a magnetic field generation system. At 530, signals can be detected from the MNP-NB complex that reflect a response to the external magnetic field. At 540, a conformational change in a structure of the protein in the sample can be determined from the signals. When the present disclosure refers to delivering an MNP-NB complex, it of course contemplates and includes the delivery of a large number of MNP-NB complexes to a sample. In addition, when the present disclosure refers to detecting signals from MNP-NB complexes, it includes and refers also to the detection of signals from MNP-NB complexes that are attached to proteins or other materials.

The exemplary process described in FIG. 5 can result in signals that convey information about the conformational changes in the proteins.

FIG. 6 is a diagram illustrating exemplary changes in signals from samples having different numbers of open and closed channels, in accordance with certain aspects of the present disclosure. In the top portion of FIG. 6, a first sample 610 is shown having proteins with most of the channels closed (solid circles). A simplified depiction of the resultant first signal 620 obtained by a detector is shown by the inset to the right. The first signal can therefore represent the state of the sample 610 prior to a conformational change caused by introduction of ligands, changes in the environment around the proteins, etc.

In the bottom portion of FIG. 6, sample 610 is shown having proteins with most of the channels open (open circles). A simplified depiction of the resultant second signal obtained by a detector is shown by the inset to the right. The second signal 630 can therefore represent the state of sample 610 after a conformational change caused by introduction of ligands, changes in the environment around the proteins, etc.

When the present disclosure refers to the determination of conformational changes in the structure of proteins, such generally refers to the analysis of magnetic response signals (described further herein) over time, or at different times. In one implementation, a signal recorded at a time of interest can be compared with a previous-acquired signal, such as a baseline signal, a template signal reflective of a known biological condition, etc. As such, determining the conformational change can include determining a ratio of the signal to a baseline signal, a difference of the signal and a baseline signal, etc. In some embodiments, frequency analysis of the signals can be performed, for example, a frequency decomposition of the signal. In other implementations, the determination of conformational changes can include the analysis of magnetic response signals continuously over time.

In some embodiments of the present disclosure, signals from samples containing MNP-NB complexes, such as those described above with regard to FIG. 6, can be analyzed with magnetic particle spectroscopy (MPS). MPS can be utilized for rapid, inexpensive, and high-accuracy bioassays and can be utilized as a biosensing tool that can monitor the instant and/or dynamic magnetic responses of magnetic nanoparticles. The present disclosure contemplates that the determination of conformational changes in proteins can also be analyzed with the use of MPS.

FIG. 7 is a simplified diagram illustrating plots of exemplary magnetic particle spectroscopy measurements, in accordance with certain aspects of the present disclosure. In some embodiments, the magnetic field generation system can be configured for magnetic particle spectroscopy, which can include being configured to measure a response at the detector based on the signals. This can include, for example, the detector being configured to convert the magnetic field variations/signals from the MNP-NB complex to a response (e.g., a voltage and/or current) that can be digitized and read out/recorded/analyzed. An example of detecting a conformational change is depicted in the upper portion of FIG. 7, showing an example plot of a response over time at a detector. The dashed line represents an example of a first signal 710 prior to, for example, a conformational change in proteins in the sample. The solid line represents an example of a second signal 720 acquired at a different time than the first signal and reflects the conformational change by demonstrable differences in amplitude from the first signal.

Some MPS methods can include determining frequency harmonics of the response, where the conformational change can be determined based at least on the frequency harmonics. For example, changes in amplitudes of the harmonics in the signal can indicate an amount of conformational change occurring in the sample proteins. An example of such is depicted in the lower portion of FIG. 7 where the response at the detector is shown decomposed into harmonics 730 of a fundamental frequency ($f_0$). The first harmonic (at a frequency $2f_0$) and second harmonic (at a frequency $3f_0$) are also shown with the amplitudes of the fundamental frequency and the harmonics for the MNP-NP complexes increasing (as shown by the solid lines compared to the dashed lines) when the proteins have undergone conformational changes.

In some embodiments, MPS can be performed by applying (for example by the magnetic field generation system of FIG. 4A) combined low frequency (e.g., 50 Hz) and high frequency (e.g., 5 KHz) AC magnetic fields to MNPs, of amplitudes being, for example, between 5-10 mT. The magnetic moments of MNPs follow the time-varying external field directions through a combined Neel and Brownian relaxation mechanism. As such, their electromagnetic response can be detected with, for example, pickup coils that may be amplified and/or band passed to reduce noise or other unwanted signal components. The signal due to the relaxation process can reflect the degree of freedom of physical rotational motion of MNPs, for example, as bound MNPs can be considered to have fewer degrees of freedom than unbound MNPs. Specifically, conjugation of chemical substances including protein molecules, aptamers, and other nonmagnetic materials onto MNPs can hinder or even block this Brownian relaxation. As a result, binding can cause a phase lag between magnetic moments and external AC fields. Accordingly, weaker dynamic magnetic responses can be observed from bound MNPs. When MNPs are attached to other molecules, their relaxation dynamics change, which can be detected by analyzing the MPS signal.

Compared to other optical, mechanical, and electrochemical sensing techniques, such magnetic sensing techniques can have reduced background noise from biological samples that may interfere with the signal. The reduced interference can arise from most biological substrates being nonmagnetic (or paramagnetic) and MNPs may therefore be the primary sources of the magnetic signal.

Additionally, the determination of conformational changes in proteins contained in samples (such as those described above with regard to FIG. 6) can be analyzed with the use of AC susceptibility (ACS) measurements.

Figure 8:
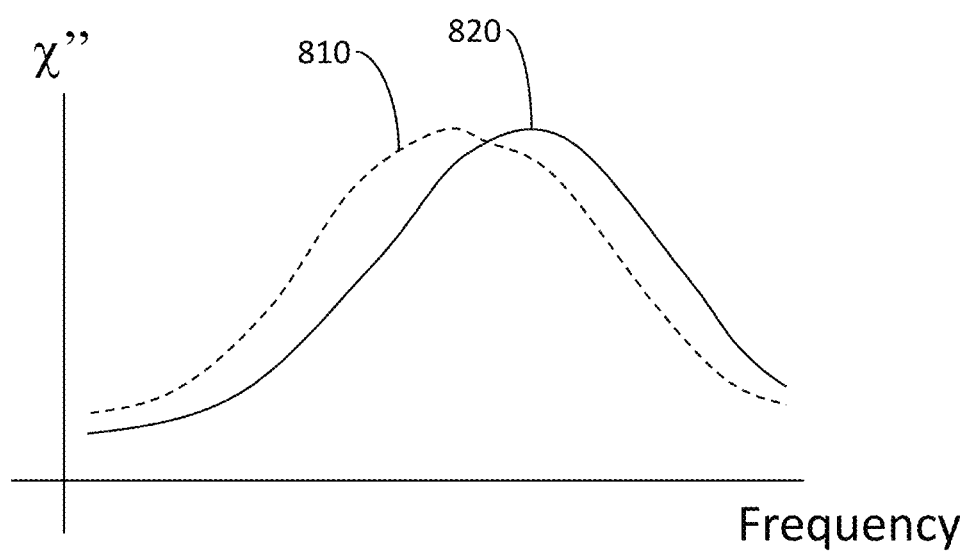
FIG. 8 is a simplified diagram illustrating a plot of exemplary AC susceptibility (ACS) measurements, in accordance with certain aspects of the present disclosure.

The simplified diagram of FIG. 8 illustrates an exemplary plot of AC susceptibility measurements in accordance with certain aspects of the present disclosure. In some embodiments, the magnetic field generation system can be configured for AC susceptibility measurements that can include being configured to measure a detector response (e.g., a voltage or current) based on signals and then determine a magnetic susceptibility.

FIG. 8 shows one example where the magnetic susceptibility (with imaginary part $\chi''$) changes. For example, a shift from a baseline signal 810 with a generally lower frequency spectra to a signal 820 having a generally higher frequency spectra may be observed (in addition to possible changes in amplitude) as a result of a degree of conformational changes of proteins in the sample. This can indicate, for example, an increase in the effective Brownian relaxation time ($T_B$) of the MNP-NB complexes in the sample being analyzed. The magnetization of MNPs in time varying magnetic fields may be measured with ACS in terms of frequency spectra. One or more magnetic field sensors (e.g., fluxgate sensor(s)) can be utilized to measure the ACS frequency spectra, for example, as detector 420b in FIG. 4B.

In some embodiments, the above methods can be combined such that the conformational change can be determined by performing both magnetic particle spectroscopy and AC susceptibility measurement.

In further embodiments, the external magnetic field can be generated at a frequency that causes resonance in the MNP-NB complex bound to the protein, where the signal is increased by the resonance. For example, elasticity of the sample medium and/or chemical/electrostatic binding between proteins or other targets to which the MNP-NB complexes are bound to can create a natural frequency for oscillation. Proper choice of the applied magnetic field, accounting for the relaxation time, can result in resonances where the response of the MNP-NB complex may be significantly increased.

Following are examples of additional methods that can be utilized in accordance with the various techniques utilizing MNP-NB complexes described herein. In some embodiments, an experimental method can include introducing ligands to a sample, with the ligands causing the conformational change in the structure of the protein by binding to the protein. The conformational change can then be determined based on the signals from the MNP-NB complex(s) and also based on a baseline signal obtained for the sample prior to the introduction of the ligands.

Another experimental method can include delivering MNP-NB complexes to a sample, for example, to replace those that have become unbound or otherwise leave or become non-functional in a sample. One exemplary method can include delivering an amount of MNP-NB complexes over time to the sample, where at least a portion of the MNP-NB complexes become unbound or leave the sample over time. The method can also include determining, from the signals over time, conformational changes of proteins in the sample. In some embodiments, the unbinding or leaving of the MNP-NB complexes can occur at a certain removal rate and the delivering of additional MNP-NB complexes can be at (or near, e.g., ±1%, 5%, 10%, etc.) the removal rate, such as to compensate for the removal.

In various embodiments, instead of (or in addition to) determining a conformational change in a protein, changes in the environment around the MNP-NB complex can be determined. One method of doing such can include delivering a Magnetic NanoParticle-NanoBody (MNP-NB) complex to a sample containing a protein, wherein the MNP-NB complex will bind to the protein in the sample. An external magnetic field generated with a magnetic field generation system can be applied to the sample. Signals can be detected from the MNP-NB complex that reflect a response to the external magnetic field. The method can include determining, from the signals, an environmental change around the protein in the sample.

In some embodiments, the environmental change can be a change in the electrical background surrounding the protein. For example, the electrical background change can be caused by a stroke, the introduction of a chemical that increases or decreases local bioelectrical activity, etc. As used herein, the term "electrical background" refers to electric fields at or near the MNP-NB complex such that the electric fields influence the response of the MNP-NB complex to external magnetic fields. For example, if a patient has a stroke, an epilepsy attack, or rupture of a blood vessel in the brain causing hyper excitation, a large number of ions may move, causing electrical currents. These electrical currents can affect the magnetic response of the MNP-NB complex because molecular bonds are affected by the nearby electric fields. As such, these electrical fields can induce characteristic signatures in the readout of signals from the MNP-NB complexes.

In some embodiments, the environmental change can be a change in the pH surrounding the protein. For example, the environmental change of the pH can be caused by a change in blood oxygenation. Because pH regulates most chemical reactions inside the body, a change in pH can induce some degree of conformational change in a protein as well as modify the strength of its bonds, which can in turn affect how loose or tight the MNP-NB complex is attached. pH can change also due to location: some areas in the body have different pH (brain, gut, blood, cancer tissue). If blood oxygenation changes (such as for a patient having COVID) the blood pH will change.

Similarly, in some embodiments, temperature may change and changes in temperature can also affect the magnetic response signals from the MNP-complex as higher temperatures correspond to faster molecular movement.

The concepts described above can be applied in any of the applications and processes described in detail below.

A protein can be described as a naturally occurring, extremely complex substance that consists of amino acid residues joined by peptide bonds. Proteins are present in all living organisms and include many essential biological compounds such as enzymes, hormones, and cell membrane channels. Specific amino acid sequences can be utilized to uniquely identify a protein or a specific part of it. When a disease (like cancer or Covid-19) attacks the body usually this attack is caused by proteins and thus detection of these proteins, or proteins that the body makes in response, can be used to detect the disease. An important family of proteins are the ionotropic membrane receptors. These proteins sit in the cellular membrane and can open a selective pore on the membrane allowing different molecules to go in or out of the cell. The opening and close of these channels is caused by a conformational change of the protein that can be triggered by the interaction with a ligand (drug induced change), or by changes in the membrane potential (voltage induced change). Another relevant group of membrane receptors are the metabotropic membrane receptor proteins which, after undergoing a conformational change, don't open a pore but instead modulate pathways of intracellular reactions, controlling the actions of neurotransmitters and ion channels through second messengers.

Almost all processes that occur in the human body are mediated, in one way or another, by proteins. For example, when glucose is transported by a protein inside a pancreatic β-cell, changes in the membrane potential open voltage sensitive channels in proteins that allow calcium ions to enter the cell triggering the release of insulin. In the nervous system, neurons communicate to each other at the synapses by having the presynaptic neuron release neurotransmitter that is captured by protein receptors in the postsynaptic neuron that in turn change their conformation opening channels that allow charged ions to go inside or outside the postsynaptic neuron, inducing a change in its membrane potential.

Therefore, detection of proteins can allow for the detection of normal and pathological condition of the body, and detection of the state of membrane protein channels (open or closed) can allow monitoring of physiological processes like homeostatic regulation of glucose or neuronal communication, the effectiveness of drugs designed to cause conformational changes in membrane receptors, etc.

Neurons communicate with each other through electrical and chemical signals. The exchange of information occurs at the synapse where two neurons (the pre and post synaptic neurons) become very close but no physical contact is made between them. The electrical signal, or action potential, is a voltage wave that runs from the cell body area to the axon terminals, through a thin fiber called axon, on the presynaptic neuron. When the action potential reaches the terminal, voltage gated calcium channel proteins open and calcium enters the cell. If the intracellular calcium concentration is high enough, vesicles with neurotransmitter can fuse with the cell membrane and their content is expelled to the synaptic cleft. There are many kinds of neurotransmitters that can cause different effects upon their release. The membrane receptor proteins in the postsynaptic cell bind to the neurotransmitter and specific channels are opened, such as shown by the examples of conformational changes depicted in FIGS. 2 and 3. These channels allow specific ions to flow inwards or outwards from the neuron. As such, depending on which neurotransmitter was released and which channel they activate, different effects like inhibition, excitation, or modulation of the postsynaptic neuron can be produced. Thus, merely knowing that a presynaptic neuron fires an action potential does not fully specify what kind of neural communication process is occurring.

Neurotransmitter receptor channels can be broadly divided in metabotropic and ionotropic receptors and these in turn can be subdivided into several families of ligand-specific receptors. Types of ionotropic receptors include: GABAA receptors, glutamate NMDA receptors, glutamate kainate receptors, glutamate AMPA receptors, glycine receptors, nicotinic acetylcholine receptors (nAChR), serotonin 5-HT3 receptor, etc. Types of metabotropic receptors include: adrenergic receptors, dopamine receptors, GABAB receptors, glutamate receptors mGluR, Histamine receptors, Muscarinic acetylcholine receptors (mAChR), opioid receptors, serotonin (5-HT) receptors, etc.

Each of these families in turn have different subtypes that can have opposite effects on the membrane potential or metabolic state of a postsynaptic cell, thus knowledge of the specific protein that is being activated by the neurotransmitter may aid in understanding neuronal communication.

Neural activity can be measured by detecting action potentials at the presynaptic level, with signal transduction occurring when the action potentials trigger the release of neurotransmitters that open membrane protein channels in the postsynaptic neurons. However, the present disclosure describes systems, methods, and computer software for measuring neural activity by, for example, measuring whether specific postsynaptic channels are being opened, such as by determining corresponding conformational changes with the disclosed MNP-NB complexes and magnetic field generation systems. This can provide information about the precise nature of the postsynaptic effects being caused by presynaptic action potentials, for example, inhibition, modulation, long vs short term excitation, etc. As shown by the magnetic field generation systems of FIGS. 4A and 4B, such methods can be non-invasive, and measurements can be done in the absence of direct contact with the sample or target for measurement, allowing for remote monitoring of membrane protein kinetics.

The MNP-NB complexes disclosed herein can be utilized for biological laboratory studies, integrated into devices, and/or used in humans. In human subjects, such methods can be used in vivo for monitoring both presence and function (e.g., conformational changes from channels opening/closing) of specific proteins, including postsynaptic receptors in the nervous system. Additionally, the disclosed utilization of MNP-NB complexes can be performed in-vitro on cell cultures, brain slices, etc. In vivo applications can include, anesthetized animals placed near an MNP-NB detection system, larger subjects like humans wearing a portable system with the collection coils and the electromagnets embedded in a helmet, after delivery of the MNP-NB complexes into the central nervous system (CNS), etc.

Embodiments described herein for a continuous release system can be utilized for long-term monitoring of neuronal activity. CNS delivery can be made to some extent via IV or orally. If faster delivery is needed, other methods can be used like osmotic and chemical opening of the BBB, disruption of the BBB by focused ultrasound or intra-cerebro-ventricular and intrathecal infusions. In addition, non-invasive techniques like enhanced transcellular transport, use of carrier systems, increased lipid solubility of the MNP-NB complex, trojan horse approach, monoclonal antibody fusion proteins, prodrug bioconversion strategies and intra-nasal delivery can also be utilized.

Detection of neural activity, such as described above, can be facilitated by the utilization of the MNP-NB complexes as described herein. In some embodiments, signals from MNP-NB complexes can be utilized to identify particular brain activity, including associating such activity with thoughts. Such measurements of brain activity can then be utilized to control machines. For example, in one embodiment, a method can include measuring human brain activity of a subject based at least on signal(s) from the MNP-NB complex(s) as described herein. A machine instruction can then be generated which, when executed by a machine, can cause the machine to perform an operation.

Such monitoring of neural activity in a safe manner on freely behaving subjects can be utilized to study the human brain, to understand the neurological basis of an idea, to allow fast and efficient communication with machines by, for example, patients with disabilities to control robotic limbs, people to control and communicate with their electronic devices, etc.

For example, if a particular waveform, spectra, amplitude, etc., of a signal is detected, an instruction can be generated based on the identification. A more specific example can include where the amplitude(s) of signal(s) measured in various locations of the brain are associated with a command to trigger an operation such as opening an application on a smartphone, controlling a networked automobile to turn or brake, etc.

Some embodiments can include effectively identifying thoughts of a human based on mapping of user-identified thoughts to measured signals. Such applications can include measuring human brain activity of a subject based at least on the signals and analysis described herein. The human brain activity can be mapped to a thought as indicated by a subject. For example, a subject can confirm they felt pain during gathering of the signal, that the subject was thinking of a word or emotion, etc. Once the mapping has been established, the method can include determining subsequent thoughts based on subsequent signals and the mapping.

In some implementations, by performing tomographic scanning of the emitted spectra, 2-D in vitro imaging of neural activity and 3-D in vivo imaging can be developed from the present disclosure. Such imaging can perform functional imaging of brain activity and other organs in humans, development of a BMI (brain machine interface) for medical applications, BMI for consumer electronics, etc.

In another application of the technologies described herein, muscle cell activity can be determined. Muscles are excitable cells that can express both metabotropic and ionotropic receptors. For example, muscle contraction can occur after a conformational change is caused by the release of acetylcholine from the axons of motor neurons opens sodium channels. The opening of the channel causes an increase in the membrane potential of the cell, which in turn opens calcium channels that trigger the muscle contraction. Upon systemic or local administration of an MNP-PB complex specific to a part of the channel that undergoes the conformational change (e.g., as shown by the examples of FIGS. 2 and 3), muscle cell activity can be monitored wirelessly allowing the study of muscle contraction with high detail, as well as the effect of drugs modulating the activity of these channels. Similarly, heart rate is regulated by the sympathetic and parasympathetic system that activates cholinergic and adrenergic receptors in the heart. By monitoring the activity of these channels (e.g., with a magnetic field generation systems such as in FIGS. 4A and 4B), it will be possible to detect heart disease and assess the state of heart wirelessly. Some embodiments of the present disclosure can also monitor the underlying phenomena that causes muscle contraction: the binding of myosin to actin filaments, allowing myosin to function as a motor that drives filament sliding by causing a conformational change in the actin molecules.

Most drugs that affect the central nervous system as well as other excitable cells, are ligands that bind to either ionotropic or metabotropic membrane receptors allowing charged ions to flow through the membrane or block its binding site preventing the endogenous ligand to bind to it, keeping the channel closed. Prior methods for testing whether a ligand is effective are based on expressing the channel on culture cells and measuring with pipette electrodes in vitro the amount of current flowing in or out of the cell in presence and absence of the drug. This process requires highly trained staff, usually only one cell can be recorded at a time, and is slow and expensive. Furthermore, the recorded effects in vitro are not always replicated in the live organism and the fact that the cell is impaled and dialyzed by the electrode can alter the effect of the ligand under study. In addition, this methodology cannot be used in live, freely behaving organisms. The embodiments described herein can be utilized to wirelessly detect conformational changes, such as opening and closing of channels. This can provide a low cost, high throughput method for drug testing that can be used both in vitro on single cells and after administration of the MNP-NB complex at the right site, in live, freely behaving organisms.

Applications utilizing the techniques described herein can include determining the effectiveness of a drug, for example based on the signals received by the disclosed processes monitoring the opening and closing of protein channels. While some conformational changes may be incidentally or indirectly related to the effects of a drug, in some cases the drugs can be designed to cause conformational changes in membrane receptors. In such cases the methods described by the present disclosure can directly measure a drug's effectiveness.

Other applications can include determining the presence (i.e., existence) and/or amounts of various compounds or biological features in the body based on the signals. For example, one embodiment can include determining a presence and/or amount of a drug in a subject based on the signal. In cases where a drug is known to have an affinity for binding to the MNP-NB complex, the measured change in signal that would result from such binding can then reflect the presence and/or amount of the drug in the sample. As another example, the determination can be based on an inference due to effects of the drug on the environment of the MNP-NB complex. For example, if a drug causes a change in temperature or pH, and this change affects the response of the MNP-NB complex, then it can be inferred that the drug is present in the sample.

In other embodiments, methods can include determining a presence and/or amount of multiple types of proteins based on the signal. Such embodiments can be based on introducing different MNP-NB complexes that may each have their own affinities for binding to a particular type of protein (there are over 20,000 human proteins plus many more encoded by non-human genomes and the disclosed methods can be used to detect any of them, and other types of antigen molecules). For example, multiple proteins can be detected in a small sample of fluid or tissue. As stated above, nanobodies can also bind to other compounds besides proteins like polypeptides, lipids, nucleic acids, etc. Such nanobodies can include relevant molecules for monitoring human health like glucose, lactate, and others. The presence of these compounds can be measured continuously by infusing new MNP-NB complexes periodically either via a pump, a patch, or orally while the detection system can be miniaturized as a wearable device.

In general, any process involving proteins that undergo a conformational change can be monitored with the embodiments of the present disclosure. For less sensitive detectors, larger numbers of MNP-NB complexes may need to be attached and information about the population of receptors may also be utilized. For higher resolution magnetic field generation systems configured to generate stronger magnetic fields, finer spatial resolution can be obtained, including to the single cell level. The system can be implemented in different ways with either the electromagnets and or the detection coils either fixed on a chamber that can scan a subject, like in MM imaging, as a handheld device like a metal detector or a wearable device in the form of a watch, patch, helmet, etc.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A method for determining a conformational change in a structure of a protein, the method comprising:
   delivering a magnetic nanoparticle-nanobody (MNP-NB) complex to a sample containing the protein, wherein the MNP-NB complex will bind to the protein in the sample;
   applying an external magnetic field with a magnetic field generation system to the sample;
   detecting signal from the MNP-NB complex that reflects a response to the external magnetic field, wherein the detecting comprises performing magnetic particle spectroscopy and/or AC susceptibility measurement; and
   determining the conformational change in the structure of the protein by detecting the signal in the sample and comparing the detected signal to a baseline signal obtained prior to the conformational change.

2. The method of claim 1, wherein the conformational change is an opening or closing of a channel in the protein.

3. The method of claim 2, wherein the channel is a part of a membrane receptor or is in a membrane of a cell.

4. The method of claim 2, wherein the channel is part of a membrane protein that regulates cell physiology.

5. The method of claim 1, wherein the MNP-NB complex includes an MNP with a diameter of 5-50 nm and an NB with a diameter of 1-5 nm.

6. The method of claim 5, wherein the MNP-NB complex comprises an avidin coated MNP conjugated to NB through biotin.

7. The method of claim 1, wherein the determining of the conformational change utilizes magnetic particle spectroscopy.

8. The method of claim 7, further comprising determining frequency harmonics of the signal, wherein the conformational change is determined based at least on the frequency harmonics.

9. The method of claim 1, wherein the determining of the conformational change utilizes AC susceptibility measurements.

10. The method of claim 1, wherein the magnetic field generation system is configured for AC susceptibility measurement, wherein the detecting comprises measuring a detector response and determining a magnetic susceptibility, wherein the conformational change is determined based at least on the magnetic susceptibility.

11. The method of claim 1, wherein the determining of the conformational change utilizes both magnetic particle spectroscopy and AC susceptibility measurements.

12. The method of claim 1, further comprising:
   introducing ligands to the sample, the ligands causing the conformational change in the structure of the protein by binding to the protein.

13. The method of claim 1,
   wherein delivering the MNP-NB complex to the sample comprises delivering an amount of MNP-NB complex over time to the sample, where at least a portion of the MNP-NB complex that bind to the protein in the sample become unbound from the protein in the sample over time;
   wherein detecting the signal from the MNP-NB complex comprises detecting the signal over time from the MNP-NB complexes bound to the protein in the sample; and
   wherein the conformational change of the protein is determined from the signal that is detected over time.

14. The method of claim 1, further comprising determining an effectiveness, presence and/or amount of a drug in a subject based on the signal due to the conformational change.

15. The method of claim 1, wherein the conformational change is a result of an environmental change around the protein in the sample.

16. The method of claim 15, wherein the environmental change is a change in an electrical background surrounding the protein or a change of pH surrounding the protein.

* * * * *